Oct. 21, 1924.
W. A. CHRYST
CLUTCH
Filed July 11, 1922
1,512,675
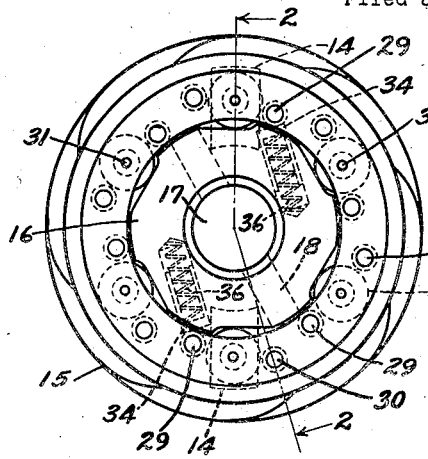
Fig.1
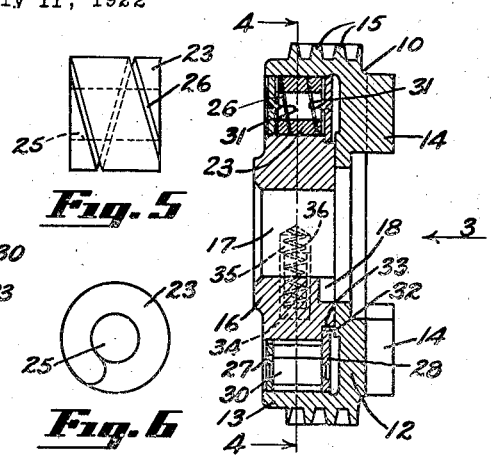
Fig.5
Fig.6
Fig.2
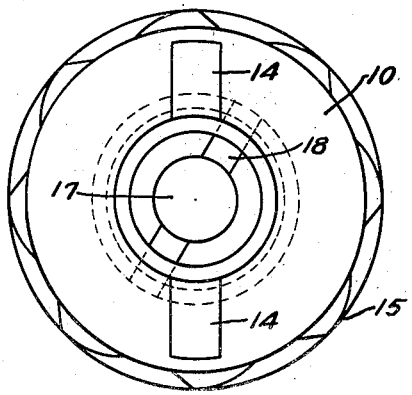
Fig.3
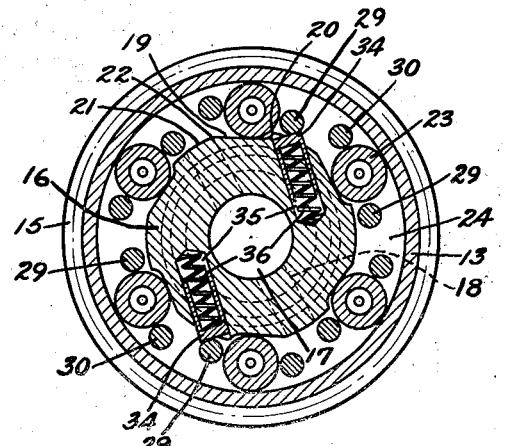
Fig.4
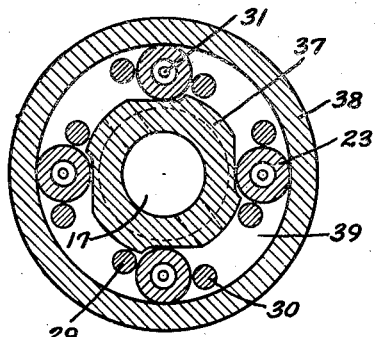
Fig.9
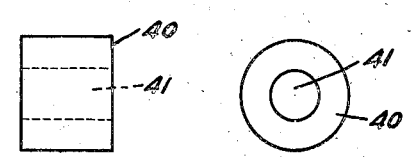
Fig.7
Fig.8
Witnesses
Irvin A. Greenwald
Lloyd M. Keighley
Inventor
William A. Chryst
By Joe W. Morrison
Attorney Patented Oct. 21, 1924.

1,512,675

UNITED STATES PATENT OFFICE.

WILLIAM A. CHRYST, OF DAYTON, OHIO, ASSIGNOR TO THE DAYTON ENGINEERING LABORATORIES COMPANY, OF DAYTON, OHIO, A CORPORATION OF OHIO.

CLUTCH.

Application filed July 11, 1922. Serial No. 574,172.

*To all whom it may concern:*

Be it known that I, WILLIAM A. CHRYST, a citizen of the United States of America, residing at Dayton, county of Montgomery, State of Ohio, have invented certain new and useful Improvements in Clutches, of which the following is a full, clear, and exact description.

This invention relates to overrunning clutches and its principal objects are to improve the operation, and promote the life of clutches of this type.

In the accompanying drawings:

Fig. 1 is a plan view, taken on the cam side, of an overrunning clutch embodying the present invention;

Fig. 2 is a longitudinal sectional view taken substantially on the line 2—2 of Fig. 1;

Fig. 3 is a plan view of the clutch taken from the opposite side from Fig. 1, as shown by the arrow marked 3 in Fig. 2;

Fig. 4 is a transverse sectional view of the clutch taken substantially on the line 4—4 of Fig. 2;

Fig. 5 is a side view of a roller employed in the clutch;

Fig. 6 is an end view of the roller;

Fig. 7 is a side view of a modified form of a roller;

Fig. 8 is an end view thereof; and

Fig. 9 is a transverse sectional view of a modified form of clutch.

In Figs. 1 to 6 inclusive, 10 is the outer clutch element or shell formed with a radial wall 12 supporting a cylindrical flange 13 which substantially encloses the inner clutch elements, 14 are driving lugs formed on the wall 12 and adapted to seat in slots in a driving shaft (not shown) and 15 are gear teeth formed on the outer surface of the cylindrical flange 13. This type of clutch is especially adapted to drive the generator of an ignition system for an internal-combustion engine. For this purpose the clutch is driven from the shell and the teeth 15 are employed to drive a distributor in timed relation with the engine to supply sparking impulses to the several cylinders of the engine.

16 is an internal clutch element or cam having a central aperture 17 adapted to receive the shaft of the generator armature driven by the clutch through a key (not shown) seating in a radial slot 18 in the inner face of the cam. If desired the cam may be the driving member of the clutch and the shell the driven member. Cam 16 is formed with flatted portions 19 extending across the cam and terminating in an abrupt shoulder 20 at one end of the surface and merging into the outer cylindrical surface 21 of the cam at the point 22 at the opposite end of the flatted portion. The number (herein 6) of flatted surfaces is the same as the number of rollers 23 located transversely of the cam and shell in the annular channel 24 provided between the two.

In one form of roller employed in the present invention, the roller is formed as a cylindrical shell or tube having a longitudinal opening 25 which permits the roller to yield under compression, the roller being formed also with a spiral slot 26 which extends through the wall of the roll and causes the roller to be more resilient under load.

These rollers are mounted in a cage comprising side members 27, 28, held in spaced relation by tie rods 29, 30, riveted to the side members and located in pairs relative to each of the rollers, the rods of each pair being separated by and grouped closely about each roller, a spacing of about 1/64 of an inch from the roller being preferred. The rollers are secured in this cage by portions 31 (Fig. 2) of the side plates of the cage struck inwardly into the hollow center of each roller. The cage is held in position on the cam and within the shell 10 by an inwardly projecting portion 32 on the inner side plate 28 of the cage, which shoulder rests in an annular recess 33 formed between the cam 16 and side wall 12 of the shell.

Mounted in diametrically opposite positions in the cam and projecting in non-radial directions therefrom, are two plungers 34 movably mounted in cylindrical holes 35 in the cam and yieldingly pressed outwardly against tie rods 29 by coiled springs 36. These plungers 34, acting on the tie rods 29, tend to force the cage and rollers in a counterclockwise direction as viewed in Fig. 4 and cause the rollers to form a driving connection between the shell and the cam. It has been found in practice that two springs are sufficient to move the cage carrying the rollers and that, owing to the fact that a small number of holes are formed in the cam, the cam and clutch can be made smaller and stronger than is possible when the cage is omitted and a separate spring is employed with each roller.

The tie rods 30 are spaced a longer distance from the cam than the tie rods 29 to avoid limiting the reverse rotation of the cam in the shell by the plunger 34 striking a tie rod 30. The small space between a pair of tie rods and an interposed roller permits a free operation of the roller. The tie rods prevent the roller taking a diagonal position on a flatted surface 19 and locking or jamming the clutch.

The cage causes all the rollers to move together toward and away from locking position with the outer and inner clutch elements, simplifies the assembly of the clutch members and permits the use of a relatively small clutch and cam.

The spring rollers employed are preferably larger than the solid rollers employed heretofore. Their size and resiliency promote the life and the operation of the rollers by avoiding jamming and failure to release when the clutch overruns. Due to the fact that a roller is compressed under load, the reactions of the forces in a roller tend to move the roller into a releasing position when the clutch overruns thus avoiding seizing or sticking. The resiliency of the rollers also cushions the operation of the clutch and tends to distribute the load over several of the rollers when, due to errors in manufacture or the limits within which the manufacturing is done, one or a part of the rollers would otherwise take the load. Should the tie rods 29, 30, be spaced farther from the rollers and a roller become wedged in a diagonal position, the pinching of the corners of the roller between the sheel and the cam, and the reaction of the roller from this pinching, will tend to straighten the roller on the cam.

In Fig. 9 is shown a modification of my invention in which the clutch is driven from the cam 37, the shell 38 is the driven member, and rollers 23 are located in a cage 39 between tie rods 29, 30, springs such as shown in Fig. 4 being omitted as centrifugal force tends to throw the rollers outwardly and perform the same function as the spring pressed plungers 34 in the clutch illustrated in Fig. 4 which is driven from the shell. Due to the fact that the spring pressed plungers 34 are omitted, the structure shown in Fig. 9 can be made smaller than that shown in Fig. 4 and have capacity for the same load.

In Figs. 7 and 8 is shown a modified roller 40 made in the form of a short length of tubing having an axial bore 41, and preferably having a greater resiliency than the solid rollers now commonly used but not as great a resiliency as the slotted rollers 23. The resiliency of the rollers is governed by the material employed in the roller and the thickness of the roller wall.

While the forms of mechanisms herein shown and described, constitute preferred forms of embodiments of the invention, it is to be understood that other forms might be adopted, all coming within the scope of the claims which follow.

What I claim is as follows:

1. A clutch having driving and driven members; and a longitudinally flexible resilient rotatable element adapted to form a driving connection between the said members.

2. A clutch having driving and driven members; and a relatively large hollow spirally slotted roller adapted to form a driving connection between the said members.

3. A clutch having driving and driven members; a plurality of hollow spirally slotted resilient rollers adapted to lock said members together; and means acting on the rollers for moving them simultaneously to or from locking position.

In testimony whereof I hereto affix my signature.

WILLIAM A. CHRYST.

Witnesses:
HAZEL E. SOLLENBERGER,
ROY F. JOHN.